US012701045B2

(12) United States Patent
Zhong et al.

(10) Patent No.: US 12,701,045 B2
(45) Date of Patent: Aug. 4, 2026

(54) CONFIGURATION MANAGEMENT AND VERSION CONTROL ON A NETWORK DEVICE

(71) Applicant: Arista Networks, Inc., Santa Clara, CA (US)

(72) Inventors: Hua Zhong, Los Altos, CA (US); Diego Alfredo Asturias, Mountain View, CA (US); Aroun Babu Pandurangan, Dublin, CA (US)

(73) Assignee: Arista Networks, Inc., Santa Clara, CA (US)

( * ) Notice: Subject to any disclaimer, the term of this patent is extended or adjusted under 35 U.S.C. 154(b) by 65 days.

(21) Appl. No.: 18/426,909

(22) Filed: Jan. 30, 2024

(65) Prior Publication Data

US 2025/0247289 A1     Jul. 31, 2025

(51) Int. Cl.
H04L 41/0813     (2022.01)
H04L 41/0859     (2022.01)

(52) U.S. Cl.
CPC ...... H04L 41/0813 (2013.01); H04L 41/0859 (2013.01)

(58) Field of Classification Search
CPC ................... H04L 41/0813; H04L 41/0859
USPC ........................................... 709/224
See application file for complete search history.

(56) References Cited

U.S. PATENT DOCUMENTS

| | | | | |
|---|---|---|---|---|
| 8,712,959 | B1 * | 4/2014 | Lim ................... | G06F 11/1415 |
| | | | | 707/633 |
| 9,910,881 | B1 * | 3/2018 | Brooker ............. | H04L 41/0859 |
| 10,057,184 | B1 * | 8/2018 | Prahlad ............... | H04L 43/50 |
| 2016/0315803 | A1 * | 10/2016 | Sadana .............. | H04L 41/082 |
| 2020/0396128 | A1 * | 12/2020 | Tseng ................ | G06F 11/0709 |
| 2024/0354102 | A1 * | 10/2024 | Hemadri ............. | G06F 8/71 |

* cited by examiner

*Primary Examiner* — Karen C Tang
(74) *Attorney, Agent, or Firm* — Patent Capital Group

(57) ABSTRACT

Particular example embodiments described herein can provide for a system, an apparatus, and a method for providing synchronization for a network device operating in a network environment. Operations may include managing a configuration for the network device by a source control management (SCM) engine configured to track changes in the configuration using a source control management system (SCM) database. The operations may also include synchronizing the configuration between the SCM database and a system database of the network device such that their stored representations of configuration information associated with the network device are substantially the same. In particular embodiments, the SCM engine comprises a Git™ element that allows for one or more differences to a configuration session to be committed with a corresponding full textual representation.

20 Claims, 4 Drawing Sheets

118
SYSTEM DATABASE

402a
COMMIT OF SESSION

120
SOURCE CONTROL MANAGEMENT DATABASE

404a
COMMIT OF SESSION
(MAY INCLUDE METADATA)

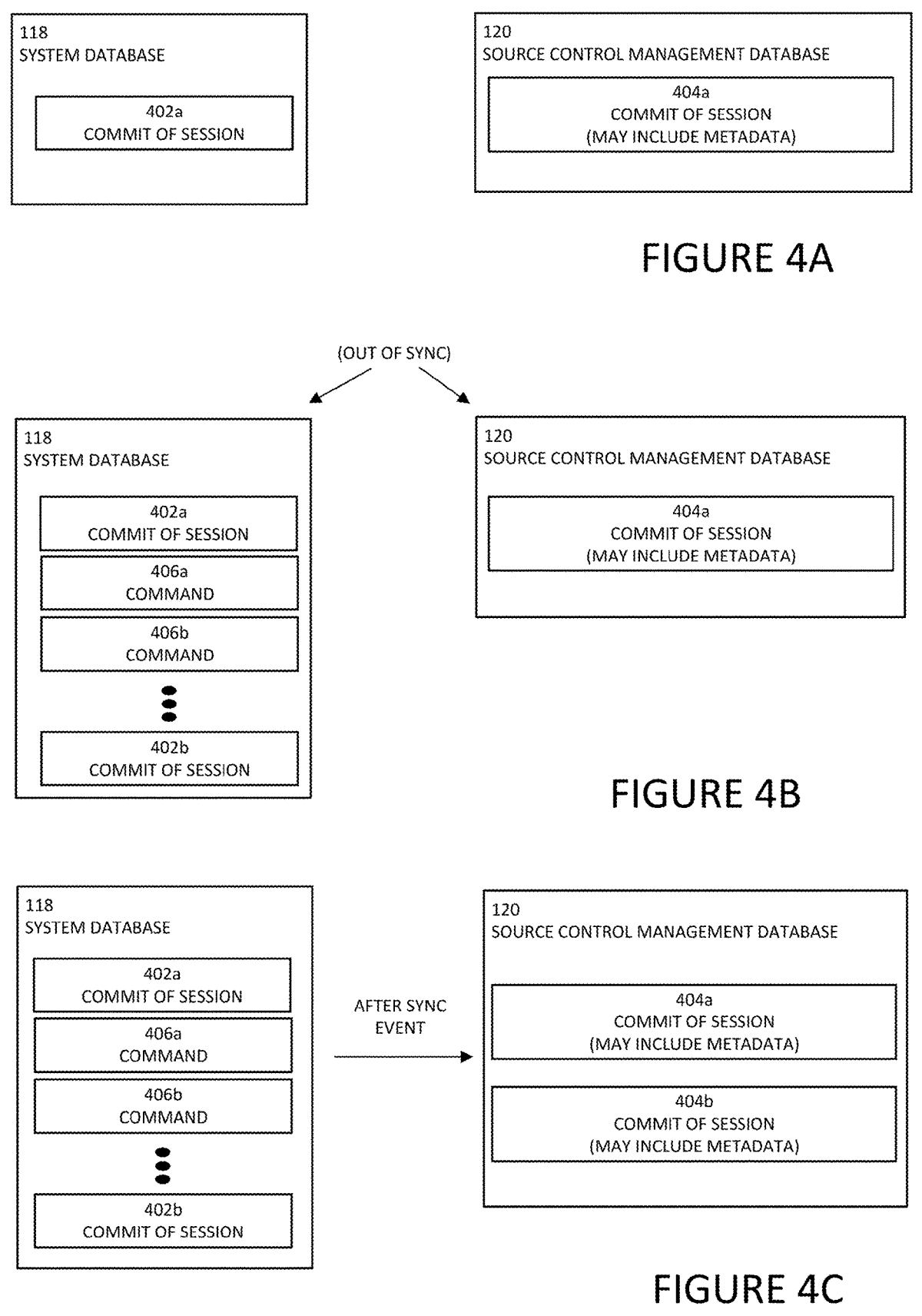

118
SYSTEM DATABASE

> 402a
> COMMIT OF SESSION

120
SOURCE CONTROL MANAGEMENT DATABASE

> 404a
> COMMIT OF SESSION
> (MAY INCLUDE METADATA)

FIGURE 4A (OUT OF SYNC)

118
SYSTEM DATABASE

> 402a
> COMMIT OF SESSION

> 406a
> COMMAND

> 406b
> COMMAND

> ⬤
> ⬤
> ⬤

> 402b
> COMMIT OF SESSION

120
SOURCE CONTROL MANAGEMENT DATABASE

> 404a
> COMMIT OF SESSION
> (MAY INCLUDE METADATA)

FIGURE 4B

118
SYSTEM DATABASE

> 402a
> COMMIT OF SESSION

> 406a
> COMMAND

> 406b
> COMMAND

> ⬤
> ⬤
> ⬤

> 402b
> COMMIT OF SESSION

AFTER SYNC
EVENT

120
SOURCE CONTROL MANAGEMENT DATABASE

> 404a
> COMMIT OF SESSION
> (MAY INCLUDE METADATA)

> 404b
> COMMIT OF SESSION
> (MAY INCLUDE METADATA)

FIGURE 4C

CONFIGURATION MANAGEMENT AND VERSION CONTROL ON A NETWORK DEVICE

TECHNICAL FIELD

This disclosure relates in general to the field of computing and/or networking and, more particularly, to a system, an apparatus, and a method to enable configuration management and version control on a network device.

BACKGROUND

In a network, a configuration defines the structure of a deployment in the network including the type and properties of the resources that are part of the deployment, any templates the configuration should use, and additional subfiles that can be executed to create a final configuration. A network configuration should be specified in order to create a deployment of a network.

The network configuration allows a user to assign network settings, policies, flows, and controls for the network. Some configuration basics include switch/router configuration, host configuration, software and firewall configuration, and network topology, which can be controlled through application program interfaces (APIs). The network configuration is essential to supporting the flow of traffic through a network, as well as supporting and enhancing network security and improving network stability.

In some examples, one of the device configuration portions of the network configuration is created using a configuration session in which commands (e.g., command line interface (CLI) commands) can be issued to a given network device. The commands do not take effect until the session is committed. A session can be entered, modified, and exited at any time without impacting the currently running configuration. The architecture would not overwrite all configuration changes made since the configuration session was created. This may not be true for newer versions of operating systems, where there is a mode that allows for merging changes together if they are mergeable, or if an error occurs. In essence, the configuration changes made in the configuration session (abbreviated 'config session' herein) may be applied in the running config of the system.

A configuration session can be aborted or removed, thereby removing the configuration session completely and freeing up memory used by the configuration session. To achieve this, the user would explicitly request that the changes in a deferred configuration session be applied to the configuration by entering a commit command and then exiting the configuration session mode. Alternatively, the user may abandon the changes by entering an abort command. An uncommitted configuration session is typically discarded after a reboot and will time out automatically, or time out after a predetermined amount of time (e.g., twenty-four (24) hours).

The network configuration can be managed via a centralized configuration manager. Configuration management is the process of maintaining computer systems in a desired state to comply with the specified network configuration. Configuration management also includes techniques for ensuring that computer systems perform in a manner consistent with user defined expectations over time.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4A-4C are simplified block diagrams illustrating example components and interactions of a system to enable configuration management and version control on a network device, in accordance with an embodiment of the present disclosure;

Figure 1:
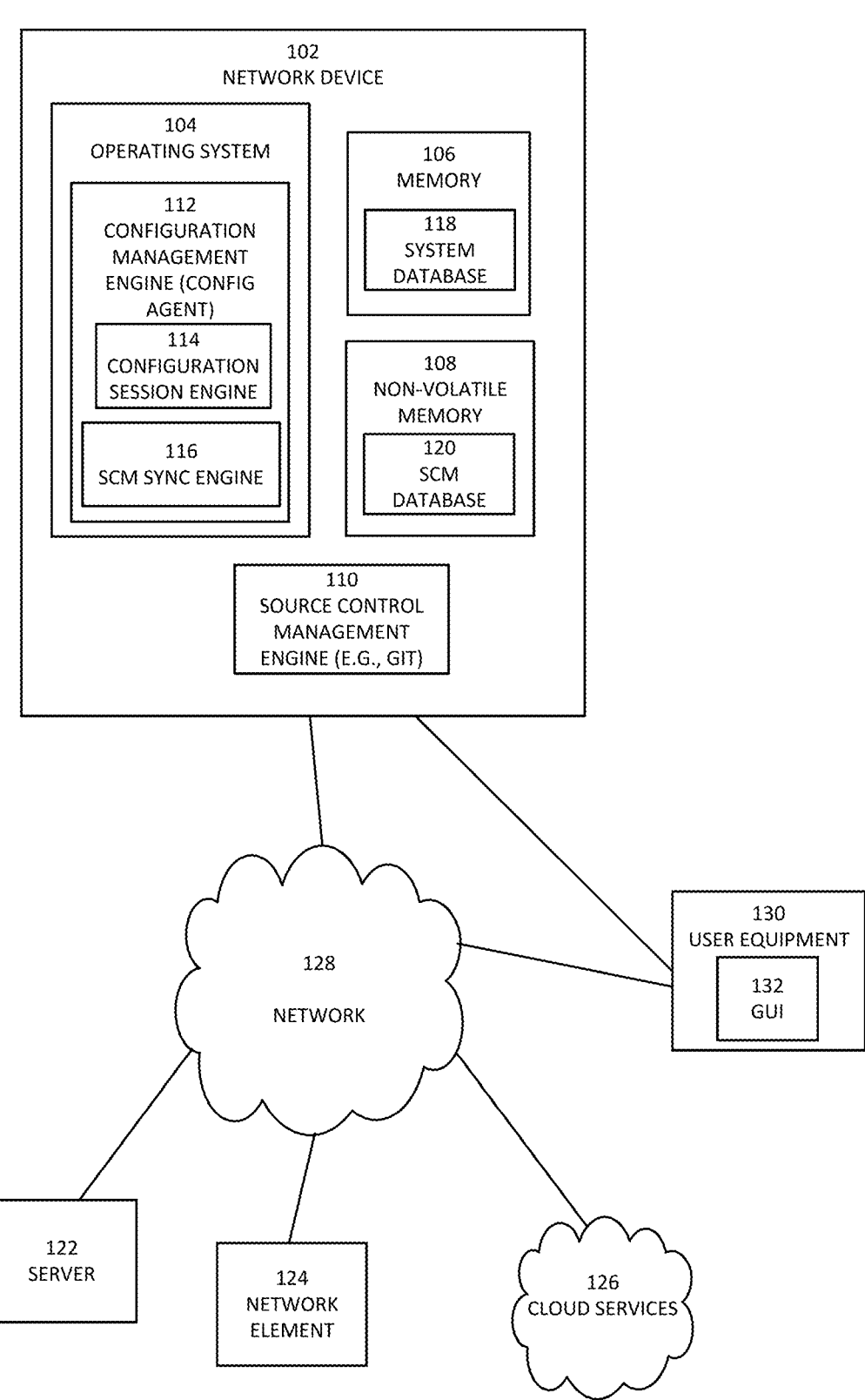
FIG. 1 is a simplified block diagram of a system to enable configuration management and version control on a network device, in accordance with an embodiment of the present disclosure.

The FIGURES of the drawings are not necessarily drawn to scale, as their dimensions can be varied without departing from the scope of the present disclosure.

DETAILED DESCRIPTION

The following detailed description sets forth examples of apparatuses, methods, and systems relating to enabling configuration management and version control on a network device, in accordance with an embodiment of the present disclosure. Features such as structure(s), function(s), and/or characteristic(s), for example, are described with reference to one embodiment as a matter of convenience; various embodiments may be implemented with any suitable one or more of the described features.

Overview

On a network device such as a switch, router, gateway, or other network device that performs any type of packet forwarding functionality (e.g., residing in a data center), the device configuration made through system management interfaces (such as a command line interface (CLI)) drives the configuration of the device. Changes to the device configuration are propagated to a central database and, in turn, to the other agents in the network. The management of configurations in existing operating systems either lacks the ability to check configuration change history, or attempts to implement proprietary mechanisms to resolve this issue. These changes can include date/time and differences, the ability to revert to a previous configuration, the ability to revert a particular configuration change in the past, the ability to amend a previous configuration change, or the ability to resolve configuration conflicts.

As an example, most current systems use a device configuration checkpoint feature. When a network device (e.g., a switch) commits device configuration changes from a configuration session, a text snapshot is taken and placed onto a flash storage. The checkpoint file allows a user to later view, list, and restore the system to previous historical configurations. Some limited metadata is also saved, including a username of a user associated with the configuration session and a timestamp of the commit for the configuration session. Some users/designers/network operators would prefer to have more enhancements to the checkpoint feature, such as the ability to view and revert to a particular configuration change in the past.

In an example embodiment of the present disclosure, a system, a method, an apparatus can enable intelligent configuration management and version control on a network device by including a source control management system (e.g., an engine) to help manage the network device configuration (e.g., for data centers, for cloud networks, etc.). The source control management engine can be added to work alongside a current network device configuration architecture to assist in intelligently managing the network. In one example embodiment, the source control management system can implement any suitable type of Git™ element, a free and open-source software, (or some other similar source control management system) that allows users to store the network device configurations and, further, provides the ability to view its corresponding change history and other features associated with the Git™ version control system. In certain implementations, users/designers/network operators can designate storing the differences between the network device configurations in any appropriate storage element (e.g., one or more databases provisioned in various locations in the network).

Note that Git™ is a Version Control System (VCS) that has the ability to record file changes over time, giving a network operator the ability to recall previous revisions, see the history of changes, etc. Using the data stored in the source control management database, the source control management system offers the ability to view and revert to a particular configuration change in the past, while offering the advantage of utilizing more management control features (other than just the checkpoint feature). While some features of the present architecture could include custom built-in components, many of the important features are naturally available on most source control management systems such as Git™. At the same time, the source control management system of the present disclosure also provides for a standard remote management interface (e.g., using a graphic user interface discussed below) to manage the network device configuration using a source control management system. For illustration purposes only, the source control management system Git™ is referenced in the description below, but any other suitable source control management systems could be used without departing from the teachings of the present disclosure.

Git™, and other source control management systems, allow the system to keep track of the username ("authorship") that committed the change to the session, the changes that were made to the configuration session, the time when the configuration session was committed, and a description of the session (if given). More specifically, Git™ trailers can be used to store metadata on each session commit, along with the difference between commits of a configuration session in a structured manner. In Git™, the information in the trailer can be simply added by using the command "git commit-trailer" appended by any number of key value pairs.

Once stored, various Git™ commands can be used to manipulate the stored content. For example, "git revert" can be used to revert a particular commit.

One important issue for network operators is to ensure the source control management system database is current and synchronized with the system database. The reason such databases are not always current and synchronized after every command is because of system constraints. Every update to the source control management system database can consume valuable system resources. If there are one hundred commands during a configuration session, one hundred commits should not be in the source control management system database. Instead, there is one commit with one hundred commands to properly conserve resources, as detailed below.

Whenever a session is committed, the current running network device configuration is updated and committed to the main system database. Then, after a synchronization event, a new change is committed (which is effectively the new running-config) with information about the new network device configuration provided in the source control management system database (using diff and Git™ trailers). In this way, each configuration session commit has a 'before' and an 'after' element and, by using the diff feature of Git™, the system can determine which changes were made and by whom. The synchronization event itself can be written/recorded/logged after a predetermined amount of time has passed (e.g., every five (5) seconds, ten (10) seconds, thirty (30) seconds, one (1) minute, etc.). Or it could occur, for example, after a period of inactivity, when there is a fetch or some request that requires synchronization, after a certain number of commands are entered (e.g., one hundred commands), when a group of configuration updates is committed, when a configuration session is committed or a configuration file is loaded, or when network activity is low.

Example Systems, Apparatuses, and Methods

Whenever a session is committed, the current running network device configuration is updated and committed to the main system database. Then, after a synchronization event, a new change is committed (which is FIG. 1 is a simplified block diagram of an example network device 102 for enabling intelligent configuration management and version control in the network device. In some examples, the network device 102 can be a switch, a gateway, a server, a router, or provisioned as a database. The network device 102 can include an operating system 104, a memory 106, a non-volatile memory 108, and a source control management engine 110, which in this non-limiting embodiment is Git™. The operating system 104 can include a configuration management engine 112 (operating as a configuration or config agent). The configuration management engine 112 can include a configuration session engine 114 and a source control management (SCM) synchronization (sync) engine 116. Memory 106 can include a system database 118. Non-volatile memory 108 can include a SCM database 120.

The network device 102 can be suitably connected to a network 128, allowing for appropriate communication with a server 122, a network element 124, and an element providing cloud services 126. The network device 102 can also be in communication with one or more user equipment 130, which can include a graphic user interface (GUI) 132. The graphic user interface 132 can be used to access the configuration management engine 112 or the source control management engine 110 to manage and/or update the network device configuration. For example, the graphic user interface 132 may be CloudVision Portal (CVP), a web-based graphic user interface for the Arista™ CloudVision™ platform, or some other graphic user interface that can be used to manage and/or make changes to the network device configuration, as detailed herein.

The configuration management engine 112 can operate as a configuration agent (config agent) used to manage a network device configuration. The configuration management engine 112 is a robust policy control engine with the ability to apply and enforce policies created by a user during a configuration session. The objective of the configuration management engine 112 is to define and control the components of a network and its infrastructure, and to maintain accurate, reliable network device configuration information.

The configuration session engine 114 can allow a user to create or modify a network device configuration using a configuration session. More specifically, the configuration session engine 114 offers a command interface that allows a user to use a configuration session to create or modify a network device configuration. The network device configuration is also known as a network setup and the broad term "network device configuration" incorporates multiple configuration and setup processes on network hardware, software, and/or other supporting devices and components. Using the configuration session engine 114, a user can set a network's parameters for control, flow, operation, along with other network device configuration settings to support network communications.

When configuration changes are committed from a configuration session, a checkpoint file of the current running configuration is saved as a text file on non-volatile memory. The checkpoint file allows a user to later view, list, and restore the system to previous historical configurations. Some limited metadata can also be saved and can include a corresponding username and timestamp. However, the checkpoint feature does not allow for enhanced features, such as the ability to view and revert to a particular configuration change in the past, the ability to amend a previous configuration change, or the ability to resolve configuration conflicts.

The source control management engine 110 can be configured to use source control management to track modifications to a source code for the network device configuration. Source control management is also inclusive of version control, as detailed below. The source control management engine 110 tracks a running history of changes to the source code for the network device configuration and it stores the history of changes to the network device configuration, for example, in the SCM database 120.

In addition to version control, the source control management engine 110 can provide a suite of other helpful features for a network operator. Once the source control management engine 110 has started tracking the changes to the network device configuration over time, a detailed historical record of the network device configuration is created and stored in the SCM database 120 located, for example, in the non-volatile memory 108. This historical record can then be used to perform additional management control features. This stands in contrast to what is allowed by the somewhat limited checkpoint feature. For example, the source control management engine 110 can keep track of the username that committed the change to the session that changed the network device configuration, which changes were made to the configuration session that changed the network device configuration, when the configuration session was committed and the network device configuration was changed, a description of the session (if given), etc. In some examples, trailers (e.g., Git™ trailers) can be used to store metadata associated with each commit, along with the differences between commits (e.g., Git™ diff) of a configuration session in a structured manner. In addition, the source control management engine 110 can hold an archive of every change to the network device configuration, and this provides a valuable record keeping function for a project's release version notes.

The data stored by the source control management engine 110 in the SCM database 120 is not the entire configuration session. Only the differences or the changes to the committed configuration session are stored in the SCM database 120. The entire configuration session can be stored separately by the configuration management engine 112 in the system database 118 that holds the native and binary data (such as integers, strings, etc.). In the system database 118, the configuration can be represented in native and binary data.

The configuration management engine 112 in the operating system 104 can use checkpoints, where the entire content of the new network device configuration can be stored in the system database 118. By using the source control management engine 110, differences (e.g., changes, updates, etc.) in the network device configuration are suitably stored in the SCM database 120. In some example implementations, a copy of the entire running network device configuration is initially stored in the SCM database 120. This can allow the system to compute and to save the differences of later changes to the network device configuration, while still retaining the full textual representation of the network device configuration. For example, in using the configuration management engine 112, if ten different commits are made during a network device configuration session, there would be ten checkpoint files with only minor differences. Using the source control management engine 110, after the first full network device configuration is saved, only the differences between commits of the network device configuration session are saved, and each whole network device configuration session would not need to be saved. In using the differences between commits of the network device configuration session, the source control management engine 110 can generate each checkpoint in full, based on the differences. Note that the broad term 'engine' as used herein encompasses any type of hardware, software, code, module, logic, and/or program capable of the activities outlined or combination thereof.

In certain example scenarios, the SCM database 120 is not the main source of the current running network device configuration. The system database 118 can still be the ultimate source of the current running network device configuration. However, the SCM database 120 can be expected to be synchronized with the system database 118, and be able to provide the current running network device configuration. Therefore, the SCM database 120 should be up-to-date and synchronized with the system database 118. System constraints prohibit the SCM database 120 from not always being up-to-date and synchronized with the system database 118 after every configuration session command or commit. Updates to the SCM database 120 continuously consume important system resources.

Whenever a network device configuration session is committed and stored in the system database 118, the changes made by the network device configuration session would become the current running network device configuration. Then, after a synchronization event, the changes or differences to the device configuration are stored in the SCM database 120. Trailers (e.g., Git™ trailers) having information about the configuration session can also be stored in the SCM database 120. In this manner, every session commit has a 'before' and an 'after' and using the stored differences between device configurations, the system can determine which changes were made and the authorship of those changes. Note that in certain example implementations, there would only be a single check-in within Git™ for each committed configuration session. In one non-limited example implementation, until a configuration session would be committed, there would not necessarily be any data stored in Git™.

For the synchronization event, it can be controlled by the source control management synchronization engine 116 and be based on particular operator needs. The timing of the synchronization event may be based on configuration designations, and this could occur at any suitable time interval and/or be triggered by any number of activities. For example, this could occur after a predetermined amount of time has passed, after a period of inactivity, when there is a fetch or some request that requires synchronization, after a certain number of commands are committed, when a group of configuration updates is committed, when a configuration session is committed or a configuration file is loaded, when network activity is low, or based on any other suitable parameter or characteristic that may be configured by a network operator.

On a network device, such as a data center switch detailed below with reference to FIG. 3, the device configuration made through system management interfaces (such as a command line interface (CLI)) drives the device configuration of the switch. For example, on an Extensible Operating System (EOS™) running on the network device, the device configuration is managed by a ConfigAgent (shown in FIG. 3). Using the ConfigAgent, any changes to the device configuration are propagated to a central database and then, in turn, to other agents in the network. The management of the configurations in existing standard operating systems either lacks the ability, or implements proprietary mechanisms, to check configuration change history. This could include date/time parameters, the ability to revert to a previous (i.e., a past) configuration, the ability to revert a particular configuration change in the past, the ability to amend a previous configuration change, and/or the ability to resolve configuration conflicts.

Figure 2:
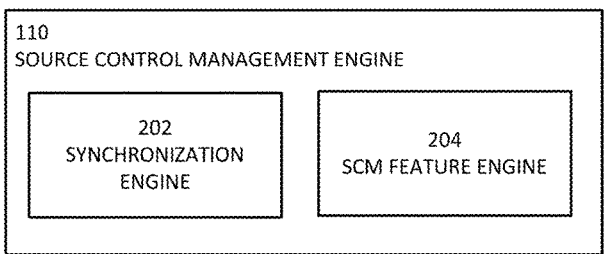
FIG. 2 is a simplified block diagram of a particular implementation of a source control management engine to help enable configuration management and version control on a network device, in accordance with an embodiment of the present disclosure.

Turning to FIG. 2, FIG. 2 is a simplified block diagram illustrating example details of a particular non-limiting implementation of the source control management engine 110 of FIG. 1. The source control management engine 110 can include a synchronization engine 202 and a source control management feature engine 204. The synchronization engine 202 can be similar to the source control management synchronization engine 116. In some examples, the synchronization engine 202 can replace the source control management synchronization engine 116. Upon a synchronization event, the synchronization engine 202 can cause the SCM database 120 to be synchronized with the system database 118. The synchronization event can be after a predetermined amount of time has passed, when there is a fetch or some request that requires synchronization, after a certain number of commands are entered, as detailed above.

The source control management feature engine 204 allows a user to make new commits, amend existing commits, create branches, perform merges, fetch/push to remote repositories, and other source control management features. For example, a branch is used to keep changes to the device configuration from being implemented until they are ready to be implemented. Work can be performed on a branch while the currently running device configuration remains stable. After work on the branch is completed, the branch can be merged with the currently running device configuration.

Figure 3:
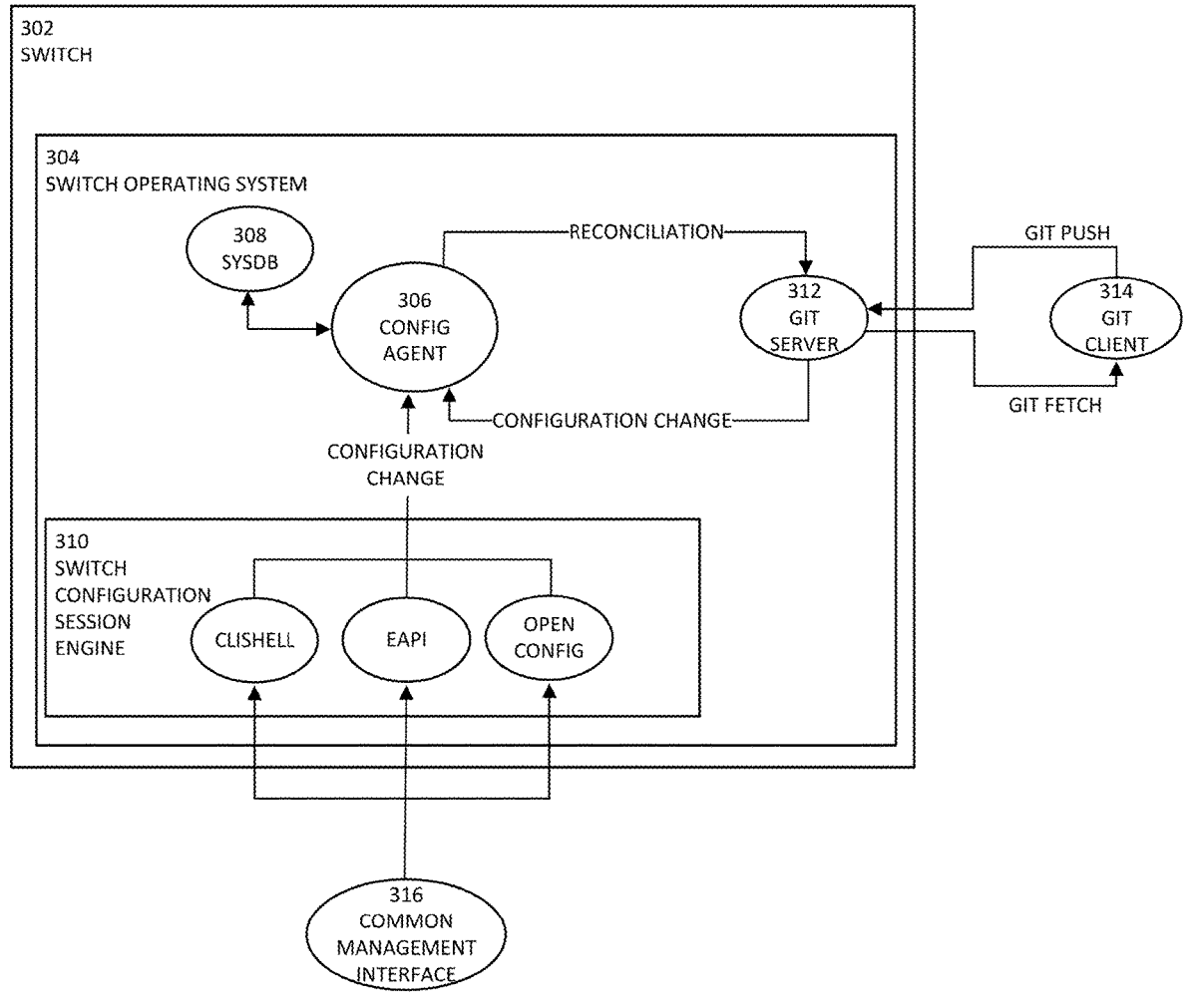
FIG. 3 is a simplified block diagram illustrating example details of a particular implementation of a system to enable configuration management and version control on a network device, in accordance with an embodiment of the present disclosure.

FIG. 2 and FIG. 3 are related in that FIG. 3 offers some of the many possible implementation details that could be provided to a given architecture capable of performing the activities discussed herein. Before detailing the operations of the embodiment of FIG. 3, it is important to understand some of the problematic issues facing network operators, system designers, and users alike. A number of prominent technological trends are currently afoot (e.g., more computing devices, more online video services, more Internet traffic, etc.). These trends have fundamentally changed the media delivery landscape and should be accommodated to improve network performance. One trend is the need for more control over configuration management.

Similarly, as the device configuration grows in complexity and the number of users working on the device configuration has increased, the management complexity associated with the device configuration has only been exacerbated. For example, when multiple users are working on a given device configuration, it is a common occurrence to make edits to a shared piece of code. Separate users may be working on a seemingly isolated feature; however, this feature may use a shared code module that does not account for two editors. Therefore, user 1 working on feature 1 could make edits and find out later that user 2 working on feature 2 has conflicting edits. This problem (known as 'version control') presents a conflict that can be effectively resolved by the source control management engine 110 of the present disclosure. The source control management engine 110 of FIG. 2 provides protection against such a scenario, as it operates as the authority for a reliable common network device configuration. Version control keeps track of every modification to the network device configuration and suitably stores every modification in the SCM database 120.

As an example, the ConfigAgent has a network device configuration checkpoint feature. When a network device (e.g., a switch) commits network device configuration changes from a configuration session, a checkpoint file of the current running network device configuration is saved as a text file on non-volatile memory. Checkpoint files allow a user to later view, list, and restore the system to previous historical configurations. Some limited metadata is also saved including a timestamp of the commit for the configuration session. Some users may seek to have more enhancements to the checkpoint feature, such as the ability to view and revert a particular configuration change from the past. Hence, what is needed is a system, an apparatus, and a method to help enable configuration management and version control on a network device.

The architectures of FIGS. 1-3 provide intelligent configuration management and version control on a network device to resolve these issues (and others). Examples detailed herein provide a source control management engine to effectively manage, update, and edit the device configuration for network devices that may belong to data centers and/or cloud networks. The source control management engine can readily be added to existing network device architectures without needing significant changes to legacy systems. In terms of the specifics for the updating feature, there are several ways to update a device configuration, but for purposes of discussion, there are essentially two main categories. The first category is when a user logs into a network device (e.g., a switch such as that shown in FIG. 3) and runs commands one by one, directly in a configuration mode (interactive). Each configuration command updates specific configurations within the device configuration.

The second category is a batch mode, where two or more commands are grouped together. The batch mode includes one or more of: a configuration session, copy <FILE> running-config, EOS Application Program Interface (EOS API or eAPI) (i.e., an API to the operating system of the network device), and other related mechanisms. In configuration sessions, a user creates a configuration session, runs commands inside the configuration session, and the configuration session is committed at the end of the configuration session, at which point the device configuration is updated. In copy <FILE> running-config, commands run non-interactively, meaning each command still updates the configuration immediately, but the commands run consecutively without delay between commands. The command API (CAPI) is similar to the copy command in that CAPI is non-interactive. Also, the user can use configuration sessions in CAPI.

In the current checkpoint feature for configuration management, the system would only generate a checkpoint when there is a configuration session commit. If a user changes the configuration through other ways, no checkpoint is generated. The main reason is that checkpointing is a resource intensive operation (generating running-configuration text output is slow), so the system will only generate a checkpoint in the batch mode (as described, the configuration session is not the only case for batch mode, but it is probably the most natural one).

Configuration sessions can be stored in a system database that holds the native/binary data (such as integers, strings, etc.). In the system database, the device configuration of the system (including configuration sessions) is represented in native/binary data. Using the source control management system, the textual representation of the running device configuration is stored in a source control management system database. The data related to the device configuration stored in the system database and the source control management database is equivalent (loading the text would result in the same binary data). Stated in different terminology, the data in the databases are substantially the same, but not exactly the same.

In operation, the source control management engines 110 of FIGS. 1-2 can use Git™ or some other similar source control management system. Git™ is chosen as an example source control management system because Git™ is open source, provides a secure remote interface, and it is widely used such that adaptability/transitioning would be easier for network operators. Once established, Git™ can be used by controllers such as a web-based graphic user interface (e.g., the graphic user interface 132 in user equipment 130) to manage device configurations (e.g., switch configurations) with semantics familiar to Git™ users (instead of using a proprietary interface such as eAPI). In addition, Git™ is a decentralized source control management system and can work with or without a server.

Turning to FIG. 3, FIG. 3 is a simplified block diagram illustrating specific example details of a system, apparatus, and method to help enable configuration management and version control on a network device. In this illustrated example of a type of network device, a switch 302 includes a switch operating system 304. The switch operating system 304 can be similar to the operating system 104 illustrated in FIG. 1. The operating system 304 can include a ConfigAgent (configuration agent) 306, a Sysdb (system database) 308, and a switch configuration session engine 310. The ConfigAgent 306 can be similar to configuration management engine 112 illustrated in FIG. 1. The Sysdb 308 can be functionally similar (performing substantially similar operations) to the system database 118 in memory 106 illustrated in FIG. 1. The switch configuration session engine 310 can be functionally similar (performing substantially similar operations) to the configuration session engine 114 illustrated in FIG. 1.

In the illustration of FIG. 3, a Git™ server can be in communication with the ConfigAgent 306 in the switch operating system 304. The Git™ server 312 is a specific implementation of the source control management engine 110 illustrated in FIG. 1. A Git™ client 314 can be associated with the Git™ server 312 and can be provisioned in the switch 302 or provided externally thereto based on particular networking needs and configurations. The Git™ client 314 is a specific implementation of the SCM database 120 illustrated in FIG. 1.

In an illustrative example, a common management interface 316 can be used to communicate with the switch configuration session engine 310 to update a device configuration. For example, the common management interface 316 can be used to enter command codes using a Command Line Interface Shell (CLI Shell), an eAPI, OpenConfig (a common, vendor-independent software layer for managing network devices), or some other program that can be used to update the device configuration. The configuration changes are received by the ConfigAgent 306, implemented, and subsequently saved in the Sysdb 308.

The Git™ server 312 can also be used to update the device configuration. For example, using the graphic user interface 132 in the user equipment 130 illustrated in FIG. 1, a user can access the Git™ server 312 and implement changes to the device configuration. The configuration changes are received by the ConfigAgent 306 and implemented. The configuration changes are also saved in the Sysdb 308. When changes to the network device configuration are made through the Git™ server 312, the running-config in the Sysdb 308 is replaced. If the changes are not made through the Git™ server 312, then the Git™ client 314 can become out-of-sync with the Sysdb 308 until a predetermined synchronization event occurs and the Git™ client 314 is synchronized with the Sysdb 308. The synchronization event can be after any predetermined amount of time has passed, as detailed herein.

Hence, Git™ is used to keep track of the history of a running configuration. More specifically, Git™ is used as a store for data related to configuration sessions that have been committed to the system database. The data stored in the source control management system database related to the network device configuration sessions is the textual representation of the running configuration (as in when the "show running-config" command in Git™ is executed). The entire network device configuration is stored separately in the system database that holds the native/binary data (such as integers, strings, etc.). For the running-config (i.e., in the output of "show running-config") is a human-readable textual format, whereas in the Sysdb is a machine-readable binary format. For example, when EOS loads the config "mtu 1500", it is translated into the Sysdb as an integer (32-bit or 64-bit, depending on the system). The two representations can be translated into each other (as EOS functions), as they effectively represent the same state. The architecture of the present disclosure can use the textual representations in the SCM because SCMs are reliable for storing texts, but not necessarily binaries.

Currently, using the configuration management in the operating system, checkpoints are used and the whole content of the new configuration is saved. Using a source control management system such as Git™, the entire configuration session does not need to be saved and only the differences or the changes to the configuration session are saved. In some examples, the entire network device configuration is saved after a configuration session is committed to allow the system to compute the differences, while still retaining the full textual representation of the network device configuration. With a source control management system such as Git™ as detailed herein, after the first full configuration session is saved, each whole configuration session is not saved, only the differences between commits of the configuration session are saved. Using the differences between commits of the configuration session, a source control management system such as Git™ can generate each checkpoint in full, based on the differences.

The source control management system database is located in non-volatile memory (e.g., flash storage). The starting file, or the initial commit, is the current running network device configuration which would be copied when the source control management begins operations if the source control management system database is empty. Any updates to the network device configuration or the configuration session will be managed by the source control management. In a specific example, because Git™ commit only stores the differences as an object, there would always be a single file in the source control management system database that could give some benefits in terms of used memory. The system is not confined to just the Git™ protocol, any source control management system may be used that will allow for configuration management and version control on a network device.

Turning to FIGS. 4A-4C, FIGS. 4A-4C are simplified block diagrams illustrating example details of a particular non-limiting implementation for enabling intelligent configuration management and version control on a network device. In an example, as illustrated in FIG. 4A, the system database 118 and the SCM database 120 are both in-sync and include the latest updated device configuration. System database 118 includes a commit of session 402a and SCM database includes 404a commit of session (that may include metadata), and both commits are associated with the same configuration. Note that the system database 118 can store a checkpoint and the SCM database 120 can store the differences between a previous device configuration and the current device configuration. FIG. 4B depicts the 'out of sync' possibility in which several commands (406a, 406b) are further entered and stored in the system database 118. For example, using the configuration session engine 114, a user can enter one or more commands to modify a given device configuration. System database 118 may include commands 406a, 406b, along with a commit of session 402b.

In the event there are one hundred commands, one hundred commits would not be provided in the SCM database 120 because of the burden on valuable system resources. Instead, there would be one commit with one hundred commands in the SCM database 120. Because the SCM database 120 is not the main source of the running device configuration, the SCM database 120 can become out-of-sync with the system database 118. Whenever a session is committed, the current running-config is committed (if different to the current file) to the system database 118. Also, changing the device configuration through non-Git™ interfaces (e.g., eAPI or CLI) causes the SCM database 120 to be out-of-sync with the system database 118.

After a synchronization event, as illustrated in FIG. 4C, the SCM database 120 would be appropriately synchronized with the system database 118. FIG. 4C includes 404a commit of session and a commit of session 404b, corresponding to the commits of session 402a and 402b, respectively, in system database 118. This means that when the system database 118 and the SCM database 120 are both in-sync they include the latest updated device configuration. In some examples, after the synchronization event, the new change to the device configuration is committed into the SCM database 120 using the Git™ diff function and, in some examples, trailers are used to achieve this result (e.g., Git™ trailers). In this manner, every session commit would have their corresponding 'before' and 'after.' The diff feature can be used such that the system determines the changes made, along with authorship. The synchronization event can be controlled by the source control management synchronization engine 116 (illustrated in FIG. 1) or the synchronization engine 202 (illustrated in FIG. 2) and may be completed after a predetermined amount of time has passed, as configured by a network operator.

Figure 5:
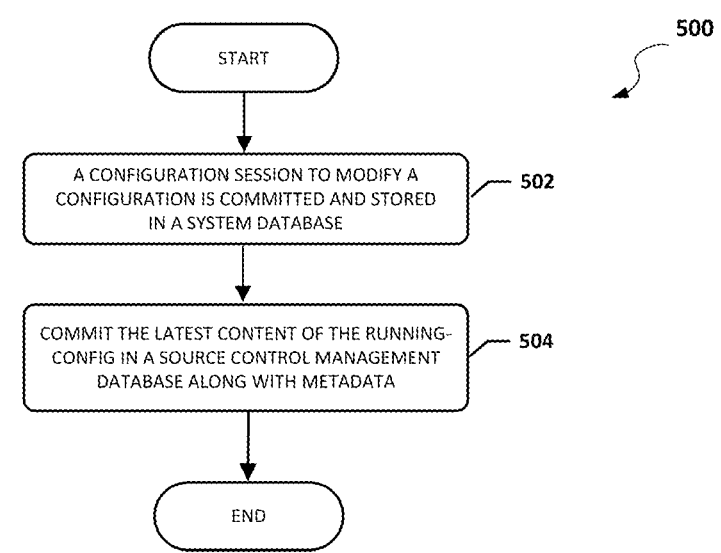
FIG. 5 is a simplified flowchart illustrating potential operations to store details regarding a configuration in a source control management database to enable configuration management and version control on a network device, in accordance with an embodiment of the present disclosure.

Turning to FIG. 5, FIG. 5 is an example flowchart illustrating possible operations of a flow 500 associated with storing details for a device configuration in a source control management database to help enable configuration management and version control on a network device, in accordance with an embodiment of the present disclosure. Specifically, in some examples, one or more operations of flow 500 may be performed by the source control management engine 110, the configuration management engine 112, the configuration session engine 114, the source control management synchronization engine 116, synchronization engine 202, and/or the source control management feature engine 204.

At 502, a configuration session is committed and stored in a system database. For example, using the configuration management engine 112, a user can start a configuration session to modify a device configuration, modify the device configuration, and commit the configuration session to create a new network device configuration. The committed configuration session can be stored in the system database 118. At 504, the architecture can simply commit the latest content of the running-config in a source control management database along with metadata. In one sense, the architecture is bringing the running-config content in Git™ up-to-date.

In operation, a file inside an SCM database holds the content of the running-config. Each time the system seeks to store the latest config in the SCM, the file is updated, and then the diffs can be seen using the SCM's utilities (e.g., diff), or the complete content at different points in the past can also be seen. In one non-limiting example scenario, the source control management engine 110 could store the difference between the previous network device configuration and the new modified device configuration in the SCM database 120, along with the appropriate trailers. More specifically, the source control management engine 110 can determine the changes made to the configuration session that changed the network device configuration, when the configuration session was committed and the device configuration was changed, a description of the session (if given), the username that committed the change to the session that changed the device configuration, etc. Git™ trailers can readily be used to store metadata on each commit, along with the differences between commits of a configuration session.

Figure 6:
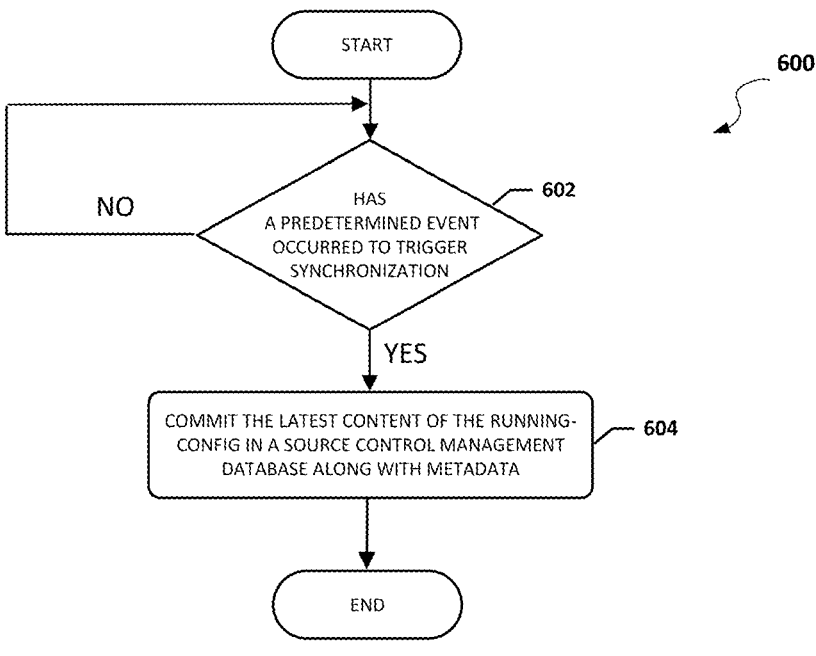
FIG. 6 is a simplified flowchart illustrating potential operations to synchronize a system database with a source control management database to enable configuration management and version control on a network device, in accordance with an embodiment of the present disclosure.

Note that before referencing FIG. 6, it is important to understand the relationship between FIGS. 5 and 6. FIG. 5 illustrates operations that occur when a user commits a config session and seeks to store it in the SCM database, while the operation depicted in FIG. 6 is driven by an event that can trigger reconciliation (e.g., when there is a discrepancy between the running-config and the SCM). The event that might trigger reconciliation could be a timer, a configuration change that is not done inside a config session, and/or both in certain scenarios.

It should also be noted that when the architecture commits a session to Sysdb (such as is the case of FIG. 5), the architecture would also actually perform the operations of FIG. 6. If the example running-config is A, the content of the running-config in SCM is B, and the architecture is committing a change to Sysdb and the running-config becomes C, the following two operations would be performed. If A is different from B, the architecture would need to reconcile this, so it would bring the SCM from B to A (as shown in FIG. 6). Subsequently, after the running-config becomes C, the architecture would also make a commit to the SCM to bring it up to C (as shown in FIG. 5). The resultant in the SCM history would show the following two commits —B→A and —A→C.

Turning to the specific example operations of FIG. 6, FIG. 6 is a flowchart illustrating activities for a flow 600 that may be associated with a system, an apparatus, and a method to help synchronize a system database with a source control management database and enable configuration management and version control on a network device. Specifically, in some examples, one or more operations of flow 600 may be performed by the source control management engine 110, the configuration management engine 112, the configuration session engine 114, the source control management synchronization engine 116, the synchronization engine 202, and/or the source control management feature engine 204. In example scenarios, a configuration session could be committed and stored in a system database. For example, using the configuration management engine 112, a user can start a configuration session to modify a device configuration, modify the device configuration, and commit the configuration session to create a new network device configuration. The committed configuration session can be stored in the system database 118.

At 602, the system determines if a predetermined event occurred to trigger synchronization. For example, the source control management synchronization engine 116 or the synchronization engine 202 can determine if a synchronization event occurred. As identified in the discussion above, that event can trigger a reconciliation, for example, when there is a discrepancy between the running-config and the SCM. Events that could trigger reconciliation could include any suitable timers, configuration changes that are not done inside a config session, or any other appropriate event instance. The synchronization event can be after a predetermined amount of time has passed, as detailed herein. If a predetermined event did not occur to trigger synchronization, the system returns to its initial starting point and a configuration session is committed and stored in a system database. Similar to the activities of FIG. 5, 604, the architecture can commit the latest content of the running-config in a source control management database, along with the corresponding metadata, as detailed herein.

Note that embodiments of switch 302 may include one or more distinct interfaces, represented by any suitable network interfaces to facilitate communication via the various networks (including both internal and external networks) described herein. Such network interfaces may be inclusive of multiple wireless interfaces (e.g., Wi-Fi, WiMAX, 3G, 4G, 5G+, white space, 802.11x, satellite, Bluetooth, LTE, GSM/HSPA, CDMA/EVDO, DSRC, CAN, GPS, etc.). Other interfaces represented by network interfaces, may include physical ports (e.g., Ethernet, USB, HDMI, etc.), interfaces for wired and wireless internal subsystems, and the like. Similarly, each of the nodes and user equipment (e.g., mobile devices) of the communication systems outlined herein can also include suitable interfaces for receiving, transmitting, and/or otherwise communicating data or information in a network environment.

Switch 302, switch operating system 304, and other associated or integrated components (such as the SCM engine 110, switch configuration session engine 310, etc.) can include one or more memory elements for storing information to be used in achieving operations associated with the configuration management and version control, as outlined herein. These devices may further keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in switch 302 could be provided in any database, register, table, cache, queue, control list, or storage structure, based on particular needs and implementations, all of which could be referenced in any suitable time frame. Any of the memory or storage options discussed herein should be construed as being encompassed within the broad term 'memory element' as used herein in this Specification.

In example embodiments, the operations for enabling intelligent configuration management and version control, outlined herein, may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar machine, etc.). In some of these instances, one or more memory elements can store data used for the operations described herein. This includes the memory elements being able to store software, logic, code, or processor instructions that are executed to conduct the activities described in this Specification.

Additionally, switch 302 and associated or integrated components such as switch operating system 304 (and SCM engine 110, switch configuration session engine 310, etc.) may include processing elements that can execute software or algorithms to perform activities to enable configuration management and version control. A processor can execute any type of instructions associated with the data to achieve the operations detailed herein in this Specification. In one example, the processors (as shown in various FIGURES) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. Any of the potential processing elements, modules, microprocessors, digital signal processors (DSPs), and other devices described in this Specification should be construed as being encompassed within the broad term 'processor.'

Regarding a physical implementation of switch 302 and its associated components such as switch operating system 304, any suitable permutation may be designed based on particular needs and requirements. In one embodiment, Git™ server 312 may be integrated with switch 302 and share hardware resources such as processing elements and memory elements. Alternatively, switch 302 and Git™ server 312 may be implemented separately from with appropriate communication pathways to switch operating system 304.

As used throughout, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Substantial flexibility is provided by the system, apparatus, and a method to enable configuration management and version control on a network device in that any suitable arrangements, chronologies, configurations, and timing mechanisms may be provided without departing from the teachings of the present disclosure.

In the detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. Reference to "one example" or "an example" in the present disclosure means that a particular feature, structure, or characteristic described in connection with the embodiment is included in at least one example or embodiment. The appearances of the phrase "in one example" or "in an example" are not necessarily all referring to the same examples or embodiments. The terms "substantially," "close," "approximately," "near," and "about," refer to being within +/−20% of a target value based on the context of a particular value as described herein or as known in the art. Similarly, terms indicating orientation of various elements (e.g., "coplanar," "perpendicular," "orthogonal," "parallel," or any other angle between the elements) refer to being within +/−20% of a target value based on the context of a particular value as described herein or as known in the art.

Note that with the examples provided herein, interaction may be described in terms of one, two, three, or more elements. However, this has been done for purposes of clarity and example only. In certain cases, it may be easier to describe one or more of the functionalities by only referencing a limited number of elements. It should be appreciated that the system, apparatus, and a method to enable configuration management and version control on a network device and their teachings are readily scalable and can accommodate a large number of components, as well as more complicated/sophisticated arrangements and configurations. Accordingly, the examples provided should not limit the scope or inhibit the broad teachings of the system, apparatus, and method to enable configuration management and version control on a network device and as potentially applied to a myriad of other architectures.

It is also important to note that the operations in the preceding flow diagrams (i.e., FIGS. 5 and 6) illustrate only some of the possible correlating scenarios and patterns that may be executed, some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although the system and method have been illustrated with reference to particular elements and operations, these elements and operations may be replaced by any suitable architecture, protocols, and/or processes that achieve the intended functionality of the system and method. It will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for providing synchronization for a network device operating in a network environment, comprising:

managing a configuration for the network device by a
source control management (SCM) engine configured to track changes in the configuration using a SCM database, wherein the SCM engine maintains version history of configuration changes with rollback capability to previous configuration states;

detecting, by the SCM engine, that a system database of the network device is out of sync with configuration information stored in the SCM database;

in response to detecting the out-of-sync condition, initiating bidirectional synchronization between the SCM database and the system database of the network device, wherein the bidirectional synchronization comprises:

(a) updating the SCM database to reflect configuration changes detected in the system database that are not present in the SCM database; and (b) updating the system database to reflect configuration changes in the SCM database that are not present in the system database, wherein the bidirectional synchronization further includes resolving conflicts between divergent configuration states.

2. The method of claim 1, wherein the SCM engine comprises a Git™ element that allows for one or more differences to a configuration session to be committed with a corresponding full textual representation.

3. The method of claim 1, further comprising:

tracking a history of a running configuration of the network device using the SCM engine; and storing a textual representation of the running configuration.

4. The method of claim 1, further comprising:

accessing the SCM engine using a graphic user interface (GUI); and updating the configuration for the network device using the GUI.

5. The method of claim 1, wherein the SCM engine is further configured to:

track one or more usernames that commit a change to a configuration session; and track previous changes to the configuration such that a previous configuration can be recalled.

6. The method of claim 1, wherein a plurality of trailers are used to store metadata associated with one or more changes associated with the configuration, and wherein information in the plurality of trailers is added by using a command appended by key value pairs.

7. The method of claim 1, wherein the synchronizing occurs after a predetermined synchronization event.

8. The method of claim 7, wherein the predetermined synchronization event is a period of time.

9. The method of claim 7, wherein the predetermined synchronization event is a number of commands.

10. The method of claim 7, wherein the predetermined synchronization event is a period of inactivity.

11. A method for managing a network device in a network environment, comprising:

updating a configuration for the network device after a configuration session is committed, wherein a source control management (SCM) engine maintains version history of configuration changes with rollback capability to previous configuration states using an SCM database;

detecting, by the SCM engine, that a system database of the network device is out of sync with configuration information stored in the SCM database; and in response to detecting the out-of-sync condition, initiating bidirectional synchronization between the SCM database and the system database of the network device, wherein the bidirectional synchronization comprises:

(a) updating the SCM database to reflect configuration changes detected in the system database that are not present in the SCM database; and (b) updating the system database to reflect configuration changes in the SCM database that are not present in the system database, wherein the bidirectional synchronization further includes resolving conflicts between divergent configuration states.

12. The method of claim 11, wherein the SCM database is coupled to a Git™ element, and the updating of the configuration is triggered by a synchronization event.

13. The method of claim 12, wherein the synchronization event is logged in the system database after a predetermined amount of time.

14. The method of claim 11, wherein the updating of the configuration is a single commit to the SCM database and reflective of a plurality of commands associated with the configuration session.

15. The method of claim 11, wherein the history of changes to the configuration allows the SCM database to be used to revert to a past configuration.

16. The method of claim 11, wherein the SCM database is used to track usernames associated with the history of changes in order to effectuate version control for the configuration.

17. A system for configuration management and version control on a network device, comprising:

memory;

at least one processor;

a source control management (SCM) engine configured to:

commit, to a system database, configuration sessions to change a configuration, wherein the system database stores native and binary data for the configuration;

track changes corresponding to the configuration using a SCM database, wherein the SCM engine maintains version history of configuration changes with rollback capability to previous configuration states; and a synchronization engine configured to:

detect that a system database of the network device is out of sync with configuration information stored in the SCM database;

initiate bidirectional synchronization between the SCM database and the system database of the network device in response to detecting the out-of-sync condition, wherein the bidirectional synchronization comprises:

(a) updating the SCM database to reflect configuration changes detected in the system database that are not present in the SCM database; and (b) updating the system database to reflect configuration changes in the SCM database that are not present in the system database, wherein the bidirectional synchronization further includes resolving conflicts between divergent configuration states.

18. The system of claim 17, wherein the SCM engine is a Git™ element configured to use Git™ trailers to store metadata related to the configuration.

19. The system of claim 17, wherein a synchronization event causes the SCM engine to synchronize the SCM database with the system database.

20. The system of claim 17, wherein the SCM engine is further configured to:

track one or more usernames that commit a change to a configuration session; and track previous changes to the configuration such that a previous configuration can be recalled.

\* \* \* \* \*